United States Patent [19]  
Morden

[11] 3,814,314  
[45] June 4, 1974

[54] VEHICLE REAR COMPARTMENT HEATER
[76] Inventor: Russell L. Morden, 1528 Drexel Rd., Lansing, Mich. 48915
[22] Filed: Oct. 20, 1972
[21] Appl. No.: 299,381

[52] U.S. Cl............... 237/12.3 B, 98/2.05, 165/43, 417/313
[51] Int. Cl............................................. B60h 1/06
[58] Field of Search.................. 237/12.3 A, 12.3 B; 98/2.05, 2.08; 165/43, 122; 417/313, 363

[56] References Cited
UNITED STATES PATENTS

| | | | |
|---|---|---|---|
| 1,951,200 | 3/1934 | Mullen et al. | 237/12.3 B |
| 2,236,475 | 3/1964 | Findley | 165/43 |
| 2,247,405 | 7/1941 | Raney | 165/122 |
| 2,260,595 | 10/1941 | Will et al. | 237/12.3 B |
| 2,319,379 | 5/1943 | Welch | 237/12.3 B |
| 3,256,828 | 6/1966 | Rule | 417/363 |

Primary Examiner—William E. Wayner  
Assistant Examiner—William E. Tapolcai, Jr.  
Attorney, Agent, or Firm—Charles R. Engle

[57] ABSTRACT

An auxiliary vehicle heater assembly including a split housing enclosing a heater core in combination with a blower and motor subassembly providing a compact unit. An electrical motor driving a squirrel type cage blower is concentrically mounted therein resulting in a compact subassembled unit. The split housing has an angularly extending face containing an air inlet opening. The blower and motor subassembly is secured to the housing in an angular disposition with the motor shaft substantially perpendicular to the surface of the angular cover face. The heater core, receiving hot water directly from the vehicle engine cooling system or being connected in series with the usual compartment heater, is also angularly disposed within the housing. A portion of the core, due to the angular mounting, has a portion extending underneath the motor and blower subassembly. This positioning of the core and the concentric mounting of the blower and motor provide a compact heater unit suitable for mounting under a vehicle seat for supplying heat to a rear passenger compartment.

2 Claims, 2 Drawing Figures

PATENTED JUN 4 1974 3,814,314

VEHICLE REAR COMPARTMENT HEATER

My invention relates to a vehicle passenger compartment heater arrangement and more specifically to a compact assembled unit suitable for mounting underneath a vehicle seat.

In accordance with my invention an auxiliary heater unit is mounted underneath the front seat for discharging heated air into the rear passenger compartment. The auxiliary heater can be connected in series with the conventional heating system to receive heated coolant or it can be directly connected to the engine coolant system for direct supply of heated coolant. The auxiliary heater includes a split housing consisting of an upper cover member and a lower pan member, the housing containing a heater core, a squirrel cage type blower, and an electrical motor all of which are angularly disposed within the housing. The housing cover member has a sloping or angular face containing an air inlet opening. The blower concentrically contains the electrical motor and they are connected together in a subassembled unit with a portion of the motor protruding through the air inlet opening in the housing cover member. The air inlet opening is of sufficient area to receive an adequate supply of preheated air from the front compartment. A portion of the housing is in the form of a scroll directing air through the core. The angular disposition of the core and the blower subassembly reduces both the axial length and the overall height of the unit making it particularly suitable for an under seat installation. The housing connects with ducts discharging warm air into the rear compartment.

Accordingly, a primary object of my invention is the provision of a compact auxiliary vehicle heating unit capable of being mounted under the front seat.

Another object of my invention is the provision of a split housing unit containing components of an auxiliary vehicle heater in an angular disposition for reducing both the height and length of the unit.

A further object of my invention is the provision of a split housing unit forming a scroll directing air through a heater core and concentrically mounting an electrical drive motor within a squirrel cage type blower, the core, blower, and motor all being angularly positioned within the housing for compact mounting within a vehicle.

The novel features which I believe to be characteristic of my invention are set forth with particularity in the appended claims. My invention itself, however, both as to its organization and method of operation, may best be understood by reference to the following description taken in connection with the accompanying drawings in which:

Figure 1:
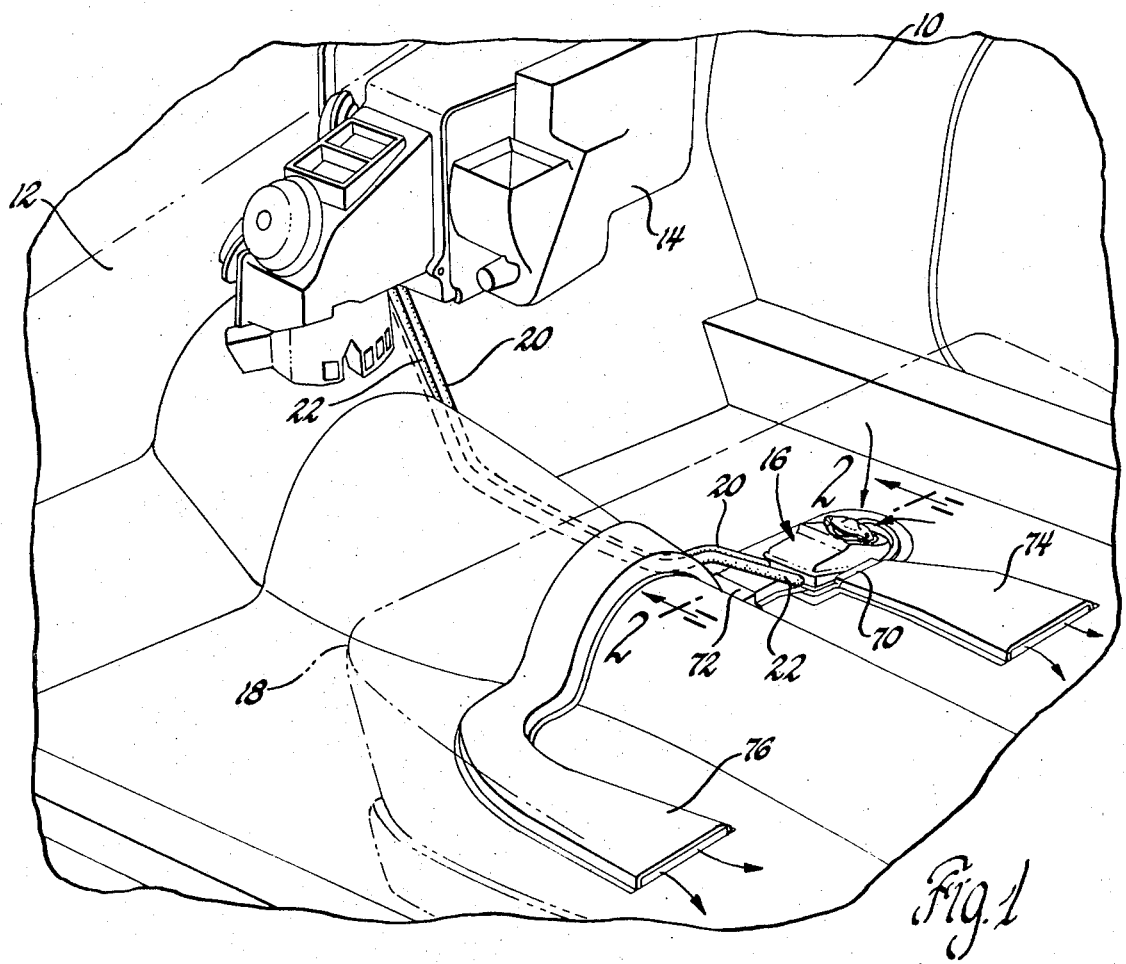
FIG. 1 is a fragmentary perspective view showing an auxiliary heater mounted under a vehicle front seat for discharging heated air into a rear passenger compartment in accordance with my invention.

With reference now to FIG. 1, a fragmentary portion of a front vehicle passenger compartment 10 includes a fire wall 12 between an engine compartment, not shown, and a rear passenger compartment, also not shown. A compartment heater 14 of the usual type, is mounted on the fire wall 12. The heater 14 contains a radiator type core which receives heated engine coolant that gives up heat to air forced through the core by an electrically operated blower. The warm air exiting from heater 14 is discharged into the front lower portions of passenger compartment 10.

In accordance with my invention, an auxiliary heater assembly 16 is mounted underneath a front passenger seat 18, as shown in phantom in FIG. 1. While I illustrate the auxiliary heater 16 underneath the front seat 18 it can readily be appreciated that the heater 16 can be mounted behind a rear seat or behind any vehicle trim panel and be effective to provide additional heat in any specified area of a vehicle compartment. The heater 16 can be connected with the conventional heater 14 or can be connected directly with the engine coolant system so that in either case heated coolant flows through a supply conduit 20 and a discharge conduit 22 both of which connect with a heater core 24 of the auxiliary heater assembly 16 as best illustrated in FIG. 2.

Figure 2:
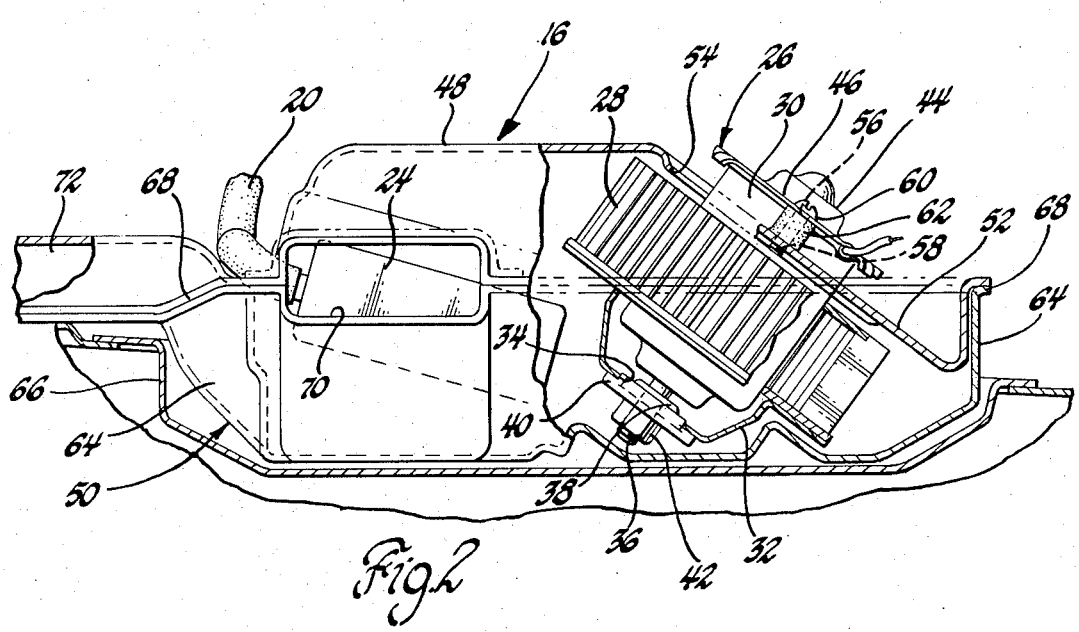
FIG. 2 is a fragmentary view, partly in section, illustrating the mounting of the heater components within a housing in accordance with my invention.

With particular reference now to FIG. 2, the heater assembly 16 includes the heater core 24 and a subassembled blower unit 26 composed of a squirrel cage type blower 28 with an electrical drive motor 30 concentrically mounted therein. The blower 28 includes a mounting bracket 32 containing an aperture 34. Shaft 36 of the motor 30 extends through the aperture 34 and has a flange 38 affixed thereto. An apertured channel bracket 40 is sized to fit upon the mounting bracket 32 and is retained in tight engagement therewith by a nut 42 threaded on the end of shaft 36. This connection drivingly connects the blower 28 with the motor shaft 36.

The opposite end of the motor 30 is enclosed by a cover 44 having a plurality of flanges 46 extending radially beyond the motor 30 for fastening the subassembled blower unit 26 to a cover 48 of a split heater housing 50. The cover 48 has an angularly extending face 52 containing an aperture 54 receiving the blower unit 26 and providing a sufficient inlet opening for supplying air to blower 28. The flanges 46 extend beyond the area of the aperture 54 with apertures 56 in alignment with threaded apertures 58 in face 52. Bolts 60 are placed in the flange apertures 56 and through suitable spacers 62, which can be composed of any material suitable for dampening motor and blower vibrations, and threaded into the apertures 58 in face 52. A bottom section 64 of the split housing 50 conforms to a recessed area 66 in the vehicle floor pan. The cover 48 and the bottom section 64 are joined together at a flanged seam 68 and are both configured to cooperatively form a scroll directing the air discharged from the blower 28 through heater core 24.

The heater core 24, as best shown in FIG. 2, is also angularly disposed within the split housing 50. More specifically, the heater core 24 is positioned within the aforementioned housing scroll so that all of the air discharged from the blower 28 must pass through the core and it is partially disposed underneath the subassembled blower unit 26. As illustrated in FIG. 1, the split housing 50 can contain various discharge openings, such as openings 70 and 72, which can connect with discharge ducts 74 and 76 to provide even distribution of heated air into the rear vehicle compartment.

It is significant that my invention includes a blower subassembly 26 angularly disposed within the split housing 50 such that a portion of heater core 24 also angularly disposed extends underneath the blower unit.

By so mounting these components, a more compact auxiliary heater unit is provided. More specifically, the height as well as the axial length of the unit is reduced so that it is readily mountable underneath a front vehicle passenger seat. Of course, it is apparent that this unit can be mounted anywhere in the vehicle to provide an additional source of heat to a passenger compartment. A further significant feature of the invention resides in the utilization of preheated air through inlet aperture 54 in the angular face 52 of the split housing 50. Utilization of preheated air results in a more efficient discharge of heated air through the ducts 74 and 76. Operation of the auxiliary heater assembly 16 can readily be controlled by providing a separate set of controls at a convenient location within the vehicle. In this manner the unit can be operated as desired.

While I have shown and described a particular embodiment of my invention it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. In a compact vehicle heater assembly of the type including a heater core receiving warmed engine coolant flowing through a closed fluid circuit while a blower forces air being heated through the core in a direction across the closed fluid circuit, the improvement in combination comprising: a split housing formed by joined separate cover and bottom members; said housing members configured forming a blower scroll in said housing; an angular face on said cover member; said angular face containing an aperture; a squirrel cage type blower; an electrical motor having a drive shaft mounted concentrically within said blower; said blower being drivingly connected to said motor drive shaft in a subassembled relationship; said blower-motor subassembly being secured to said split housing with a portion of said motor extending through the aperture in said cover face; said aperture having an area sufficient to receive said motor and provide an adequate supply of inlet air to said blower; a heater core angularly positioned within said split housing so as to have a portion extending underneath said blower; said core being placed in the scroll formed by said housing members so that all of the air discharged by said blower is forced through said core; and discharge ducts attached to said housing exhausting heated air into specified areas of a vehicle passenger compartment; the angular disposition of said blower-motor subassembly and said core within said housing reducing the overall height of the unit providing a compact heater unit.

2. In an auxiliary compact vehicle heater assembly of the type including a heater core receiving warmed engine coolant flowing through a closed fluid circuit while a blower forces air being heated through the core across the flow of coolant, the heater assembly having particular application for mounting underneath a front passenger seat to discharge heated air into a rear vehicle passenger compartment, the improved combination comprising: a split heater housing formed by joined separate cover and bottom members configured forming a blower scroll in said housing; an angular flat face on said cover member; said angular face containing an aperture; a squirrel cage type blower; an electrical motor having a drive shaft concentrically mounted within said blower and drivingly connected thereto forming a blower-motor subassembly; one end of said motor extending through said aperture; a plurality of mounting flanges overlying the surface of said face adjacent said aperture; a vibration absorbing bushing positioned between each flange and said cover face; a threaded fastener in each of said bushings securing said blower-motor subassembly to said cover member; said motor shaft being substantially perpendicular to said cover face to that said subassembly is angularly disposed within said split housing; said aperture having an area sufficient to receive said motor end while providing an adequate supply of air preheated by a firewall mounted vehicle heater to said blower; an auxiliary heater core angularly positioned within said split housing so as to have a portion thereof extending underneath said blower; said core being placed in the scroll formed by said housing members so that all of the air discharged by said blower is forced through said core; the angular mounting of said blower-motor subassembly and said core providing a compact heater assembly having a minimum height and length providing for mounting of the auxiliary heater assembly underneath a front vehicle seat; and discharge ducts connected to said split housing and being positioned to exhaust heated air from underneath the front vehicle seat into the vehicle rear passenger compartment.

* * * * *

PO-1050
(5/69)

UNITED STATES PATENT OFFICE
CERTIFICATE OF CORRECTION

Patent No. 3,814,314          Dated June 4, 1974

Inventor(s) Russell L. Morden

It is certified that error appears in the above-identified patent and that said Letters Patent are hereby corrected as shown below:

On the title page, column 1, after "Rd., Lansing, Mich. 48915" should be --Assignee: General Motors Corporation, Detroit, Mich.--.

Signed and sealed this 12th day of November 1974.

(SEAL)
Attest:

McCOY M. GIBSON JR.          C. MARSHALL DANN
Attesting Officer          Commissioner of Patent